United States Patent
Kumar (10) Patent No.: US 12,413,497 B2
(45) Date of Patent: Sep. 9, 2025

(54) SYSTEMS AND METHODS FOR DATA TRACE AND SEQUENCE DETERMINATIONS IN DISTRIBUTED NETWORKS

(71) Applicant: BANK OF AMERICA CORPORATION, Charlotte, NC (US)

(72) Inventor: Narayana Sanjay Kumar, Naperville, IL (US)

(73) Assignee: BANK OF AMERICA CORPORATION, Charlotte, NC (US)

(*) Notice: Subject to any disclaimer, the term of this patent is extended or adjusted under 35 U.S.C. 154(b) by 51 days.

(21) Appl. No.: 18/380,563

(22) Filed: Oct. 16, 2023

(65) Prior Publication Data

US 2025/0126040 A1 Apr. 17, 2025

(51) Int. Cl.
*H04L 43/10* (2022.01)
*H04L 43/02* (2022.01)
*H04L 43/04* (2022.01)
*H04L 43/12* (2022.01)

(52) U.S. Cl.
CPC .............. *H04L 43/10* (2013.01); *H04L 43/02* (2013.01); *H04L 43/04* (2013.01); *H04L 43/12* (2013.01)

(58) Field of Classification Search
CPC ......... H04L 43/10; H04L 43/02; H04L 43/04; H04L 43/12; H04L 67/10; H04L 67/535
See application file for complete search history.

(56) References Cited

U.S. PATENT DOCUMENTS

| | | | |
|---|---|---|---|
| 10,756,990 B1* | 8/2020 | Chakkassery Vidyadharan .......... | G06F 11/301 |
| 10,805,144 B1* | 10/2020 | Gangadharan | H04L 41/046 |
| 2008/0016412 A1* | 1/2008 | White | G06F 11/3409 714/48 |
| 2015/0032884 A1* | 1/2015 | Greifeneder | G06F 11/3419 709/224 |
| 2017/0034019 A1* | 2/2017 | Nataraj | H04L 43/091 |
| 2019/0018877 A1* | 1/2019 | Dickey | G06F 16/24568 |
| 2019/0098076 A1* | 3/2019 | Moon | G06F 11/302 |
| 2022/0272151 A1* | 8/2022 | Umanesan | H04L 67/1012 |

* cited by examiner

*Primary Examiner* — Johnny B Aguiar
(74) *Attorney, Agent, or Firm* — Moore & Van Allen PLLC; Michael M. McCraw (57) ABSTRACT

Systems, methods, and computer program products are provided herein for data trace and sequence determinations in distributed networks. An example method includes receiving a request for an interaction determination and determining a plurality of distributed service systems associated with the interaction. The plurality of distributed service systems include a sequence defining an order by which operations associated with the interaction are performed by respective distributed service systems and each of the distributed service systems includes trace agents that generate service system specific data trace objects. The method further includes capturing the one or more service system specific data trace objects for each of the distributed service systems and generating an interaction object based on the service system specific data trace objects for each of the distributed service systems associated with the interaction.

16 Claims, 6 Drawing Sheets

SYSTEMS AND METHODS FOR DATA TRACE AND SEQUENCE DETERMINATIONS IN DISTRIBUTED NETWORKS

TECHNOLOGICAL FIELD

Example embodiments of the present disclosure relate generally to distributed service system networks and, more particularly, to systems and methods for data trace and sequence determinations in these implementations.

BACKGROUND

Electronic networks, communication systems, and/or the like may be formed of various distributed service systems that are associated with a plurality of applications. For example, a particular interaction may implicate various distributed service systems that collectively perform operations associated with the interaction, and each service system may have various characteristics, attributes, parameters, etc. that are distinct to the respective service system. Applicant has identified a number of deficiencies and problems associated with conventional systems and associated methods. Through applied effort, ingenuity, and innovation, many of these identified problems have been solved by developing solutions that are included in embodiments of the present disclosure, many examples of which are described in detail herein.

BRIEF SUMMARY

Systems, methods, and computer program products are provided herein for data trace and sequence determination. In one aspect, a system for data trace and sequence determinations in distributed networks may include at least one non-transitory storage device and at least one processor coupled to the at least one non-transitory storage device. The processor may be configured to receive a request for an interaction determination and determine a plurality of distributed service systems associated with the interaction. The plurality of distributed service systems may include a sequence defining an order by which operations associated with the interaction are performed by respective distributed service systems. Each of the distributed service systems may include one or more trace agents that generate service system specific data trace objects. The processor may be further configured to capture the one or more service system specific data trace objects for each of the distributed service systems.

The processor may be further configured to generate an interaction object based on the service system specific data trace objects for each of the distributed service systems associated with the interaction.

In some embodiments, each service system specific data trace object may include one or more data entries associated with one or more metric characteristics of the respective distributed service system.

In some embodiments, the interaction object may be stored by a data trace specific database structure.

In some embodiments, the plurality of distributed service systems may include at least a first distributed service system and a second distributed services system. In such an embodiment, the processor may be further configured to determine a first data format associated with the first distributed service system, determine a second data format associated with the second distributed service system, and translate the first data format and the second data format to an interaction object format.

In some embodiments, the processor may be further configured to perform one or more sanitization operations on one or more data entries forming the one or more service system specific data trace objects.

In some embodiments, in capturing the one or more service system specific data trace objects for each of the distributed service systems, the processor may be further configured to generate a request transmission for each of the distributed service systems and capture a response transmission from each of the distributed service systems.

In some further embodiments, the processor may be configured to provide the response transmission from each of the distributed service systems to an intended application associated with the interaction and provide the response transmission from each of the distributed service systems to a data trace specific database structure.

In other further embodiments, the processor may be further configured to access a response transmission queue including each of the response transmissions associated with each of the distributed service systems, generate a response transmission copy for each of the response transmissions, provide the response transmissions to an intended application associated with the interaction, and provide the copied response transmissions to a data trace specific database structure.

In another aspect, a computer program product for data trace and sequence determinations in distributed networks is provided. The computer program product may include a non-transitory computer-readable medium including code that, when executed, causes an apparatus to receive a request for an interaction determination, determine a plurality of distributed service systems associated with the interaction where the plurality of distributed service systems include a sequence defining an order by which operations associated with the interaction are performed by respective distributed service systems and where each of the distributed service systems include one or more trace agents configured to generate service system specific data trace objects, capture the one or more service system specific data trace objects for each of the distributed service systems, and generate an interaction object based on the service system specific data trace objects for each of the distributed service systems associated with the interaction.

In another aspect, a method for data trace and sequence determinations in distributed networks is provided. The method may include receiving a request for an interaction determination, determining a plurality of distributed service systems associated with the interaction where the plurality of distributed service systems include a sequence defining an order by which operations associated with the interaction are performed by respective distributed service systems and where each of the distributed service systems includes one or more trace agents configured to generate service system specific data trace objects, capturing the one or more service system specific data trace objects for each of the distributed service systems, and generating an interaction object based on the service system specific data trace objects for each of the distributed service systems associated with the interaction.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below. The features, functions, and advantages that are described herein may be achieved independently in various embodiments of the present disclosure or may be combined with yet other embodiments.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

DETAILED DESCRIPTION

Embodiments of the present disclosure will now be described more fully hereinafter with reference to the accompanying drawings, in which some, but not all, embodiments of the present disclosure are shown. Indeed, the present disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, this data may be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with or otherwise interact with an entity. As such, in some embodiments, the user may be an individual having past relationships, current relationships, and/or potential future relationships with an entity. In some embodiments, the user may be an employee (e.g., an associate, a project manager, an information technology (IT) specialist, a manager, an administrator, an internal operations analyst, or the like) of the entity or enterprises affiliated with the entity. In some embodiments, the user may be a customer (e.g., individual, business, etc.) that transacts with the entity or enterprises associated with the entity. Although described hereinafter with reference to a first user and associated first user device interacting with an example system, the present disclosure contemplates that any number of users and associated user devices may interact with the systems described herein without limitation.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, light-emitting diode (LED), light, joystick, switch, buzzer, bell, and/or other user input/output device for communicating with one or more users. The present disclosure contemplates that the arrangement, presentation, organization, etc. of the user interfaces described herein may vary based upon the intended application of the system or the like.

As used herein, an "engine" or "module" may refer to core elements of an application, or part of an application that serves as a foundation for a larger piece of software and drives the functionality of the software. In some embodiments, an engine or module may be self-contained, but externally-controllable code that encapsulates powerful logic designed to perform or execute a specific type of function. In one aspect, an engine or module may be underlying source code that establishes file hierarchy, input and output methods, and how a specific part of an application interacts or communicates with other software and/or hardware. The specific components of an engine or module may vary based on the needs of the specific application as part of the larger piece of software. In some embodiments, an engine or module may be configured to retrieve resources created in other applications, which may then be ported into the engine for use during specific operational aspects of the engine. An engine or module may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

It should also be understood that "operatively coupled," "communicably coupled" and/or the like as used herein, means that the components may be formed integrally with each other, or may be formed separately and coupled together. Furthermore, the components may be formed directly to each other, or to each other with one or more components located between the components that are operatively coupled together. Furthermore, the components may be detachable from each other, or they may be permanently coupled together. Furthermore, operatively coupled components may mean that the components retain at least some freedom of movement in one or more directions or may be rotated about an axis (e.g., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, a system and an application, an accessing of stored data by one or more nodes of a computing cluster, a transmission of a requested task, or the like. As described hereinafter, an "interaction" between the system and one or more applications may be permissioned in that the ability for the system (e.g., one or more devices, subsystems, modules, etc.) to access a particular application may be controlled by permissions issued by this application. By way of a non-limiting example, a system of the present disclosure may be configured to ascertain the validity of account credentials received by the system (e.g., as part of a user account creation or otherwise). In such an example, an interaction may refer to the communication or transfer of data from a user device to a system providing account credentials.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As described above, electronic networks, communication systems, and/or the like may be formed of various distributed service systems that are associated with a plurality of applications. For example, a particular interaction may implicate various distributed service systems that collectively perform operations associated with the interaction, and each service system may have various characteristics, attributes, parameters, etc. that are distinct to the respective service system. In conventional systems, however, the ability to modify existing interactions or implement new interactions (e.g., as related to products, applications, etc.) is often complex and/or costly. For example, various legacy system implementations require particular user expertise that is either unavailable or otherwise inaccessible. Furthermore, these conventional systems are often unsuitable for testing in that the testing environments fail to accurate represent production loads and further lack an ability to proactively test due to a lack of integration awareness (e.g., a failure to appreciate the integration between distinct systems and subsystems). Due to this lack of integration awareness, various architecture objects in conventional systems may often become obsolete due to changes across the example network environment. Additionally, conventional systems fail to provide a solution capable of end-to-end tracking for a request that also provides information on the request/response with augmented information (e.g., via source code or the like).

In order to solve these issues and others, embodiments of the present disclosure provide systems and methods for data trace and sequence determinations to provide an end-to-end representation of distributed data traces associated with distributed service systems. An example system may receive a request for interaction determination (e.g., associated with an application, vendor, customer, service, and/or the like) and determine a plurality of distributed service systems associated with the interaction. The plurality of distributed service systems include a sequence defining an order by which operations associated with the interaction are performed by respective distributed service systems and each of the distributed service systems includes one or more trace agents configured to generate service system specific data trace objects. The data trace objects may be indicative of various metric characteristics associated with the particular distributed service system and used to generate an interaction object. Such an interaction object may be stored by a separate data trace specific database structure for further use (e.g., testing, metric analysis, product development, etc.) by the overall system and may, as part of an interaction object, represent the end-to-end representation of the distributed data traces associated the particular interaction.

Example System and Circuitry Components

Figure 1A:
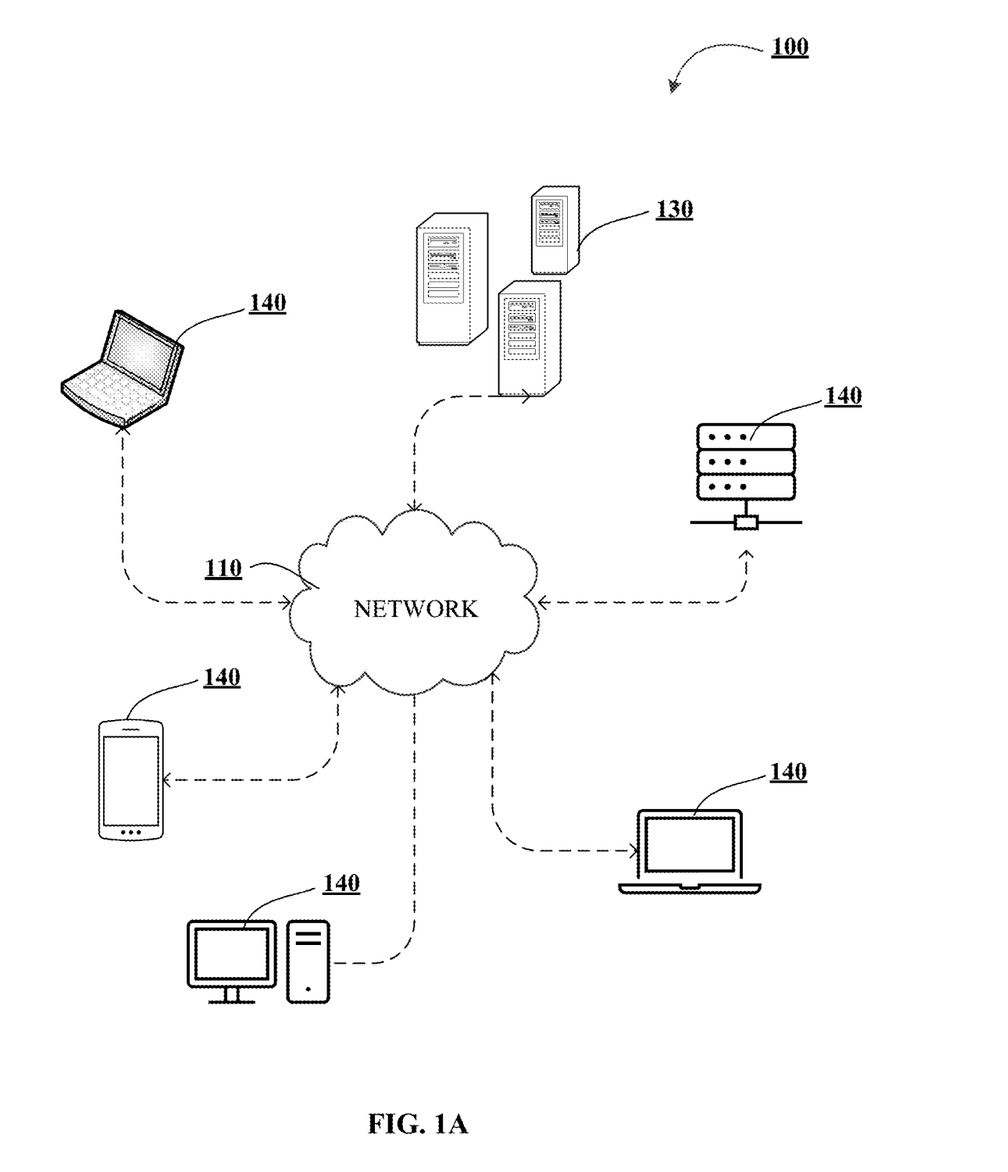
FIGS. 1A-1C illustrate technical components of an exemplary distributed computing environment data trace and sequence determinations in accordance with one or more embodiments of the present disclosure.
Figure 1B:
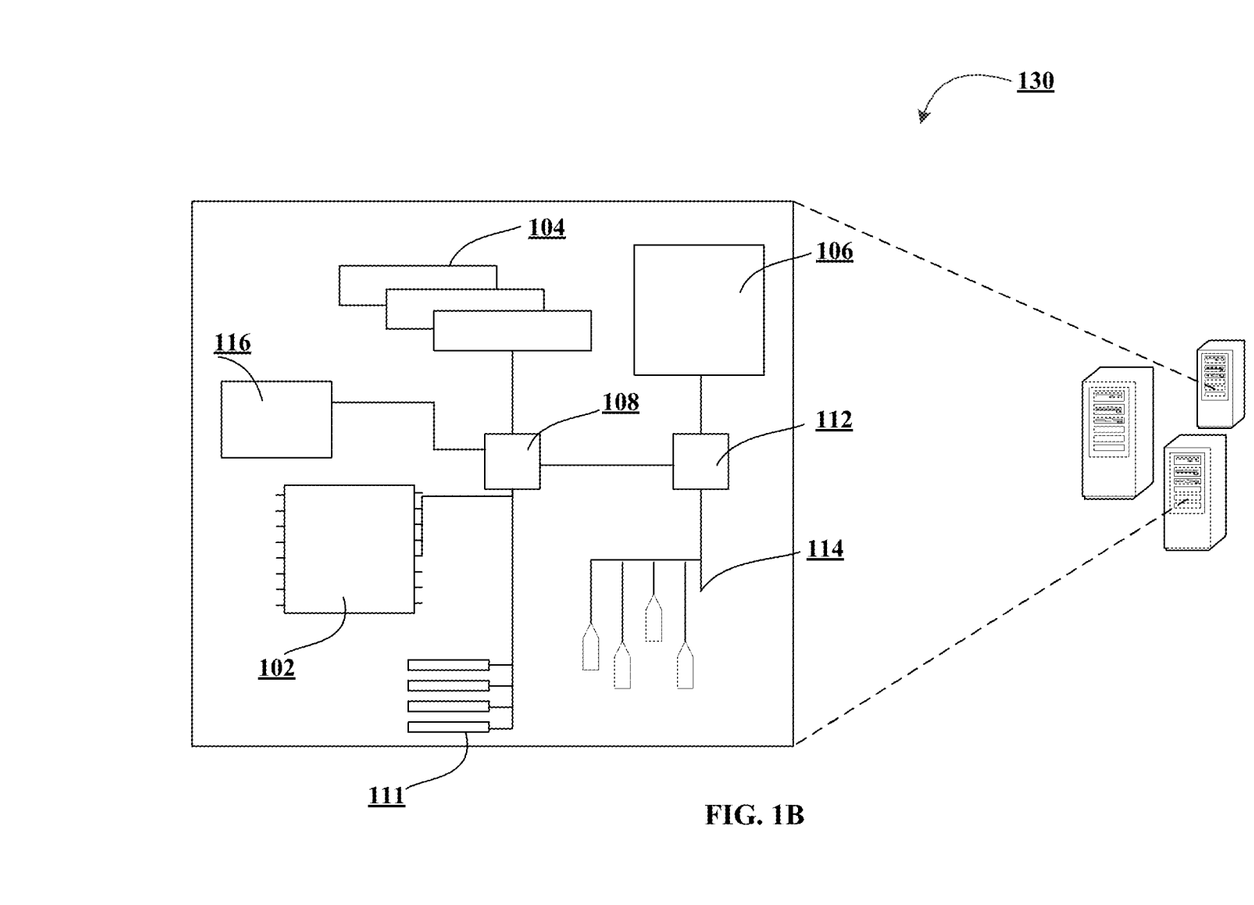
Figure 1C:
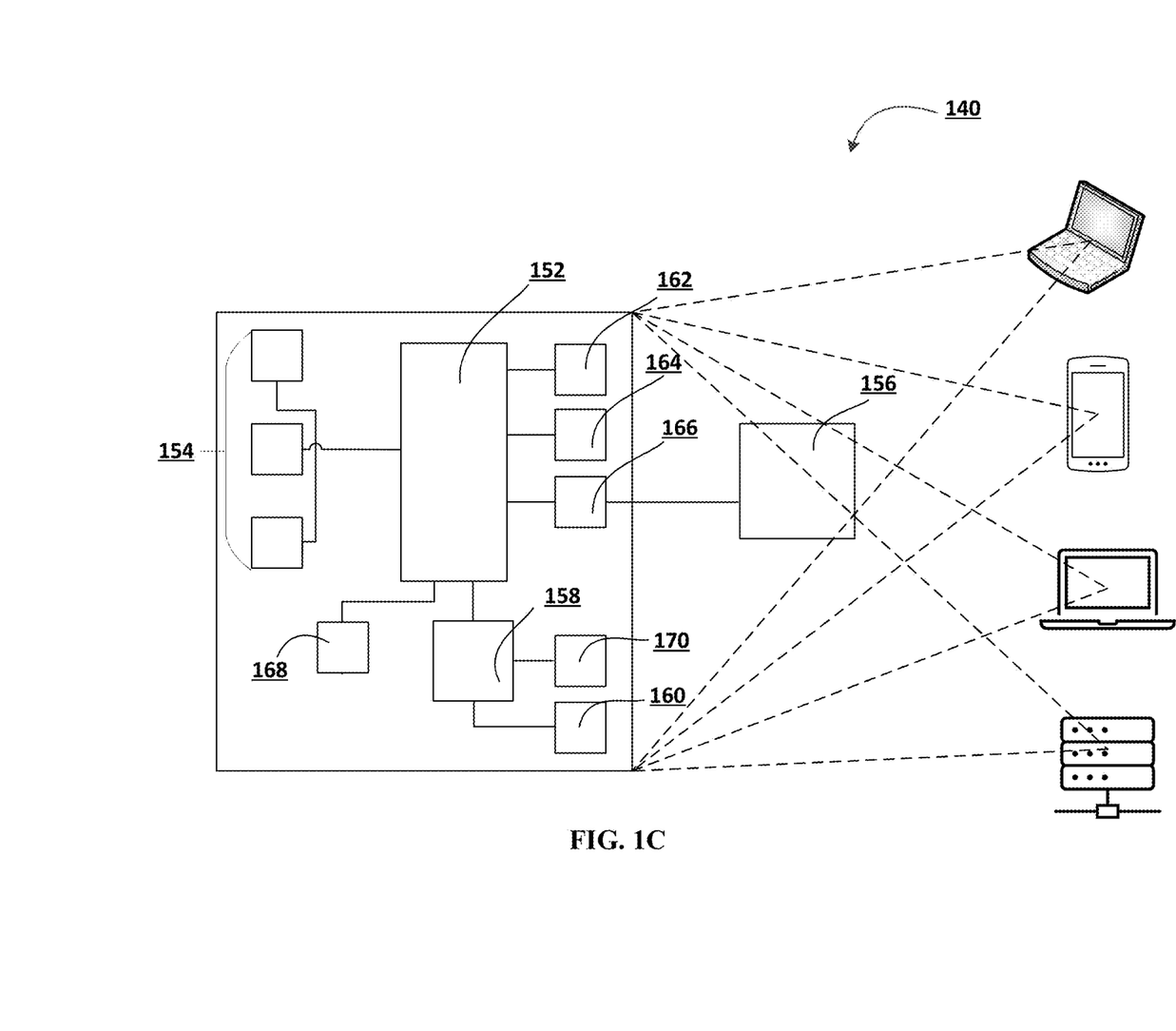

FIGS. 1A-1C illustrate technical components of an exemplary distributed computing environment for data trace and sequence determinations 100, in accordance with one or more embodiments of the present disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, the same or similar to system 130, with each system providing portions of the necessary operations (e.g., as a server bank, a group of blade servers, or a multi-processor system).

In some embodiments, the system 130 and the end-point device(s) 140 may define a client-server relationship in which the end-point device(s) 140 are remote devices that request and receive service from a centralized server (e.g., the system 130). In some other embodiments, the system 130 and the end-point device(s) 140 may have a peer-to-peer relationship in which the system 130 and the end-point device(s) 140 have the same abilities to use the resources available on the network 110. As opposed to relying upon a central server (e.g., system 130) that acts as the shared drive, each device that is connected to the network 110 acts as the server for the files stored thereon.

The system 130 may represent various forms of servers, such as web servers, database servers, file server, or the like, various forms of digital computing devices, such as laptops, desktops, video recorders, audio/video players, radios, workstations, virtual reality devices, augmented reality device, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, virtual reality devices, augmented reality device, and/or the like, electronic telecommunications device (e.g., an automated teller machine (ATM)), and/or edge devices such as routers, routing switches, integrated access devices (IAD), and/or the like.

The network 110 may be a distributed network that is spread over different networks. This provides a single data communication network that may be managed jointly or separately by each network. In addition to shared communication within the network, the distributed network may also support distributed processing. The network 110 may be a form of digital communication network, such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

As described hereinafter, the system 130 may include various subsystems, applications, services, products, etc. each referred to herein as "distributed service systems." Each of these distributed service systems may include the components, devices, circuitry, etc. described herein with reference to the system 130 and/or end-point device 140 of FIGS. 1A-1C. Said differently, the functionality or operations performed by each of the distributed service systems of the present disclosure may leverage any of the necessary structure, mechanisms, circuitry, etc. described herein, and each distributed service system may, in some embodiments, include distinct structures, mechanisms, circuitry, etc. for performing its associated operations. In order to perform the various data trace operations described herein, each of the distributed service systems may further include respective data trace agents configured to generate service system specific data trace objects, such as data indicative of one or more metric characteristics of the respective distributed service system.

As described hereinafter, the metric characteristics of the distributed service systems may include data entries indicative of the operating system metrics relating to central processing unit (CPU) usage, memory capacity and/or usage, input/output usage, network usage, trace identifier requests, and/or the like. The present disclosure contemplates that the one or more trace agents of the respective distributed service systems may use any circuitry, components, software development kits (SDKs), application programming interfaces (APIs), tools, and/or the like in order to capture, record, or otherwise access the various trace data entries generate during operations performed by the respective distributed service systems. Furthermore, the present disclosure contemplates that the data trace objects (e.g., formed based on data entries associated with the data trace) may be associated with or otherwise indicative of any metric, parameter, attribute, characteristics, etc. of the distributed service systems based upon the intended application of the system 130.

It is to be understood that the structure of the distributed computing environment and its components, connections and relationships, and their functions, are meant to be exemplary only and are not meant to limit implementations of the embodiments of the present disclosure. In one example, the distributed computing environment 100 may include more, fewer, or different components. In another example, some or all of the portions of the distributed computing environment 100 may be combined into a single portion, or all of the portions of the system 130 may be separated into two or more distinct portions.

FIG. 1B illustrates an exemplary component-level structure of the system 130, in accordance with one or more embodiments of the present disclosure. As shown in FIG. 1B, the system 130 may include a processor 102, memory 104, input/output (I/O) device 116, and/or a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system. As described above, these subsystems (or any portion of the larger system 130) may include various distributed service systems.

The processor 102 may process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 may be capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product may be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102. In some embodiments, as described hereinafter, the generated interaction object formed of various service system specific data trace objects may be stored by a data trace specific database structure (e.g., separate from a primary memory location for application operations, outcomes, etc.). As such, the present disclosure contemplates that such a data trace specific database structure may include the same or substantially the same functionality, circuitry, components, devices, etc. of the memory 104 and/or storage device 106.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and/or to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., Universal Serial Bus (USB), Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with one or more embodiments of the present disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a Microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user (e.g., an actionable notification or the like). The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 may be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or Non-Volatile Random-Access Memory (NVRAM) memory. In one aspect, a computer program product is tangibly embodied in an information carrier. The computer program product contains instructions that, when executed, perform one or more methods, such as those described herein. The information carrier is a computer-or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, virtual reality environments, and/or any of the components described herein. To this end, the system 130 may trigger an authentication subsystem that may require the user (or process) to provide authentication credentials to determine whether the user (or process) is eligible to access the protected resources. As described hereinafter, the embodiments, of the present disclosure may evaluate tokenized datasets formed at least in part by account credentials. As such, once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a Global Positioning System (GPS) device, an image capturing component (e.g., camera), a microphone, virtual reality (VR)/augmented reality (AR) devices, and/or a speaker. Similarly, in instances in which the account credentials are determined to be fabricated or otherwise invalid, the authentication subsystem precludes access to the user (or process).

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as Transmission Control Protocol (TCP)/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here may be realized in digital electronic circuitry, integrated circuitry, specially designed ASICs (application specific integrated circuits), computer hardware, firmware, software, and/or combinations thereof.

Example Methods for Data Trace and Sequence Determinations

Figure 2:
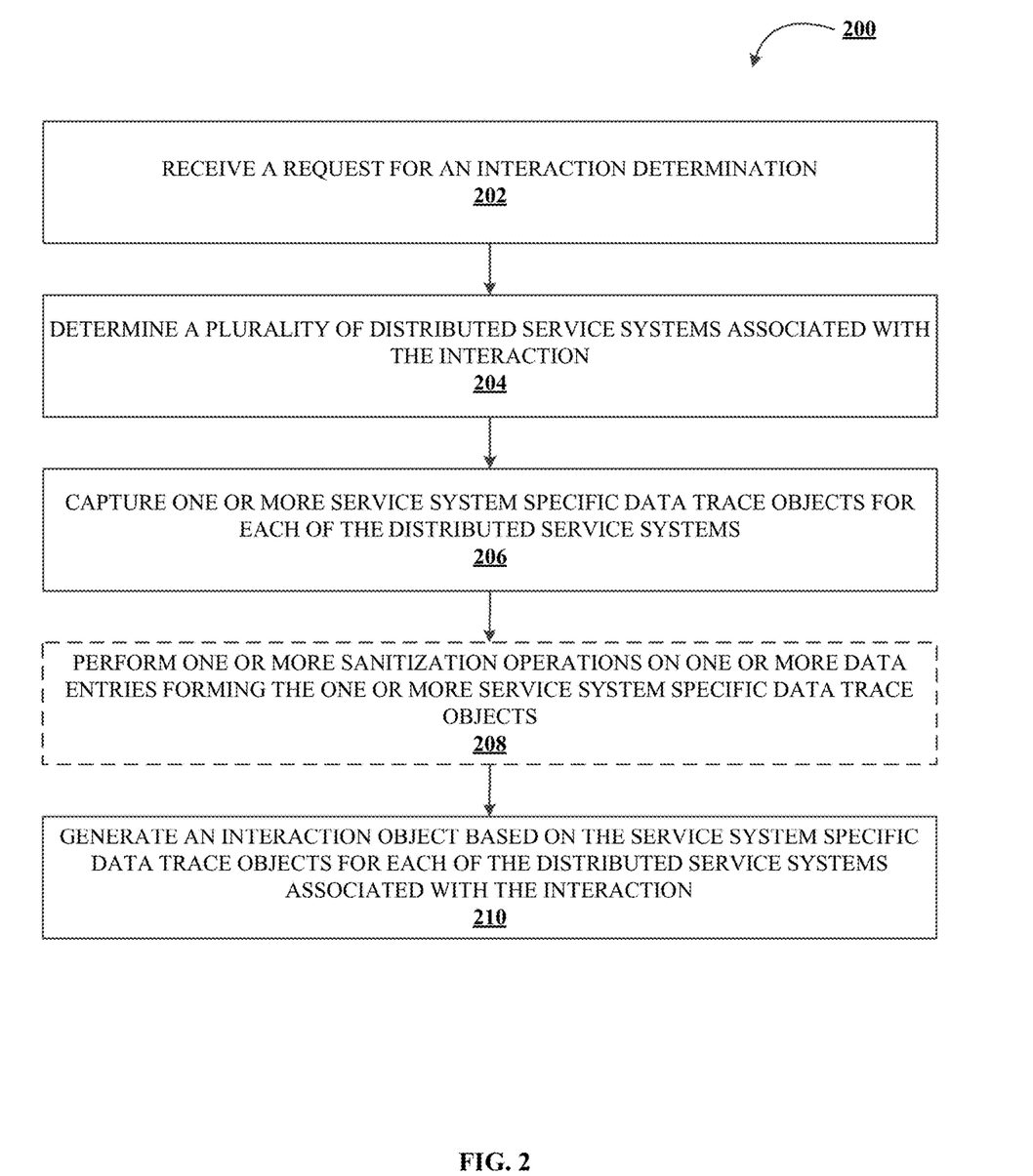
FIG. 2 illustrates a method for data trace and sequence determinations in distributed networks in accordance with one or more embodiments of the present disclosure.

FIG. 2 illustrates a flowchart containing a series of operations for data trace and sequence determinations in distributed networks (e.g., method 200). The operations illustrated in FIG. 2 may, for example, be performed by, with the assistance of, and/or under the control of an apparatus (e.g., system 130, end-point devices 140, distributed service systems, etc.), as described above. In this regard, performance of the operations may invoke one or more of the components described above with reference to FIGS. 1A-1C (e.g., processor 102, processor 152, etc.).

As shown in operation 202, the system 130 may be configured to receive a request for an interaction determination. As described above, the system 130 of the present disclosure may operate to provide a mechanism for determining an end-to-end representation of an interaction that implicates a plurality of processes, applications, products, services, etc., as performed by the distributed service systems described herein or otherwise. For example, a request for an interaction determination may refer to a request to identify the applications, products, processes, etc. that are leveraged to perform the operations associated with the requested interaction. By way of a non-limiting example, the requested interaction may refer to a request to determine a particular data entry (e.g., credential, value, threshold, etc.) of a user's account that is associated with the system 130. As such, the interaction determination of the request at operation 202 may refer to a determination of each of the applications, products, processes, etc. that are implicated in determining this particular data entry of the user's account.

In some embodiments, the request received at operation 202 may be received in response to an explicit input by a system, application, user, etc. associated with the system 130. By way of example, the system 130 may receive a request from an end-point device 140 requesting an interaction determination associated with the example data entry of the user's account. In other embodiments, the request at operation 202 may refer to an internal request of the system 130 as part of determining an end-to-end representation for interactions that are associated with the system 130. For example, the system 130 may operate to map (e.g., generate sequence diagrams or other representations) each of the interactions, applications, products, processes, etc. that are associated with the system 130. As such, the request at operation 202 may refer to an implicit request by the system 130 to determine an end-to-end representation for a particular interaction. As would be evident to one of ordinary skill in the art in light of the present disclosure, the applications, processes, subsystems, services, etc. that are implicated by a particular interaction may change over time. As such, in some embodiments, the request received at operation 202 may refer to an iterative operation for updating the end-to-end representation of the requested interaction.

Thereafter, as shown in operation 204, the system may be configured to determine a plurality of distributed service systems associated with the interaction. As described above, the interaction associated with the request may be associated with various applications, processes, services, etc. that perform operations of the interaction. As described herein, the system 130 may comprise or otherwise be communicably coupled with a plurality of distributed services systems that operate to perform these operations (e.g., a first distributed service system, a second distributed service system, etc.). The present disclosure contemplates that the requested interaction of operation 202 and any interaction of the system 130 may be associated with any number of distributed service systems based on the intended output, processes, vendor, customer, regulations, etc. associated with the interaction.

The plurality of distributed service systems may include a sequence defining an order by which operations associated with the interaction are performed by respective distributed service systems. By way of continued example, the interaction determination received at operation 202 may be associated with a request for a particular data entry (e.g., credential, value, threshold, etc.) of a user's account that is associated with the system 130. The request for such a particular data entry (e.g., the requested interaction) may, for example, require a first distributed service system of a process API and a second distributed service system of a data API, among others, and each of these systems may be associated with various request and response transmissions as described hereinafter with reference to FIG. 3. Each of these operations performed by the distributed service systems may occur in a particular order that is associated with the interaction (e.g., operations of a first distributed service system may, for example, occur before operations of a second distributed service system). The present disclosure contemplates that the sequence at which the various distributed service systems of the requested interaction determination perform their respective operations may vary based on the intended application, output, etc. of the system 130.

In order to determine the sequence of the requested interaction determination, the system 130 may monitor the various request and response transmissions that occur at each distributed service system. To facilitate this monitoring, the system 130 may, in some embodiments, assign a trace identifier (e.g., trace ID) to the data that is generated by the respective distributed service systems, and this trace identifier may propagate as this data moves between distributed service systems. In doing so, the trace identifier may refer to a distributed trace in that generated data that is associated with the requested interaction by the distributed service systems is propagated to subsequent distributed service systems in the sequence with the trace identifier. By way of a non-limiting example, each distributed service system may refer to a distinct server such that performs operations associated with the request interaction. At a first distributed service system, one or more data entries (e.g., forming data trace objects as described hereafter) that are generated at the first distributed service system may be assigned a trace identifier that is subsequently provided to a second distributed service system. The trace identifier provided to the second distributed service system may be used in conjunction with one or more data entries (e.g., forming data trace objects as described hereafter) that are generated at the second distributed service system.

Each of the distributed service systems may include one or more trace agents configured to generate service system specific data trace objects. The one or more trace agents of the respective distributed service systems may use any circuitry, components, SDKs, APIs, tools, and/or the like in order to capture, record, or otherwise access the various trace data entries generate during operations performed by the respective distributed service systems. As described above, the trace data objects generated by the distributed service systems may include data entries indicative of the operating system metrics of the respective distributed service system. By way of a nonlimiting example, the metric characteristics may related to CPU usage, memory capacity and/or usage, input/output usage, network usage, trace identifier requests, and/or the like of the respective distributed service system. The present disclosure contemplates that the data trace objects (e.g., formed on data entries associated with the data trace) may be associated with or otherwise indicative of any metric, parameter, attribute, characteristics, etc. of the distributed service systems based upon the intended application of the system 130. Furthermore, the data trace objects generated by each of the distributed service systems may refer to any data structure, arrangement, etc. that store data entries associated with the implementations described herein. Given that each distributed service system includes one or trace agents or equivalent components for generating data that is specific to the particular distributed service system, the data trace objects for each distributed service system may similarly include service system specific data.

Thereafter, as shown in operation 206, the system 130 may be configured to capture the one or more service system specific data trace objects for each of the distributed service systems. By way of continued example, the interaction requested at operation 202 may implicate at least a first and second distributed service system. In some embodiments, the capturing of the data trace objects by the system 130 may refer to transmission by the system 130 to the first and the second distributed service systems requesting the respective trace data objects generated by the respective first and second distributed service systems. Additionally or alternatively, in other embodiments, each of the distributed service systems may operate to periodically transmit the respective trace data objects to the system 130. By way of example, upon completing its associated operations (e.g., and generating data entries forming the first service system specific data trace object), the first distributed service system may transit the service system specific data trace object(s) to the system 130. In some embodiments, each of the distributed service systems may transmit the generated service system specific data trace object(s) to a data trace specific database structure.

In some embodiments, as shown in operation 208, the system 130 may be configured to perform one or more sanitization operations on one or more data entries forming the one or more service system specific data trace objects. As would be evident to one of ordinary skill in the art in light of the present disclosure, the data entries generated as part of the operations of FIG. 2 may be associated with confidential information or information having restricted access permissions. In some implementations, the data trace objects and interaction objects described herein may be used in testing operations. In order to secure the information that defines the data trace objects and interaction objects, the system 130 may operate to genericize, replace, obscure, or otherwise augment the data entries forming these objects. The present disclosure contemplates that the sanitization operations performed by the system 130 may leverage any techniques for securing underling information or data (e.g., synthetic data generation techniques, cryptographic techniques, etc.) based on the nature of the data, the intended application of the system 130, and/or the like. Furthermore, although illustrated following capture of the one or more service system specific data trace objects for each of the distributed service systems, the present disclosure contemplates that the sanitization operations may occur as part of any operations described herein (e.g., at the distributed service system level, at the data trace specific database structure, etc.)

Thereafter, as shown in operation 210, the system 130 may be configured to generate an interaction object based on the service system specific data trace objects for each of the distributed service systems associated with the interaction. As described herein, the operations of FIG. 2 may provide an end-to-end representation of the interaction that further include distributed service system level trace data. In some embodiments, the interaction object may refer to data entries configured to cause presentation of a visual representation (e.g., sequence chart or the like) illustrating the implicated distributed service systems and their associated service system specific trace data. As described herein, in some embodiments, the system 130 may include a data trace specific database structure (e.g., a storage device or repository that is separated from a standard output memory structure), and the interaction object may be stored by a data trace specific database structure. As such, the interaction object may refer to the mechanism by which the aggregated service system specific data trace objects for a particular interaction are stored.

Figure 3:
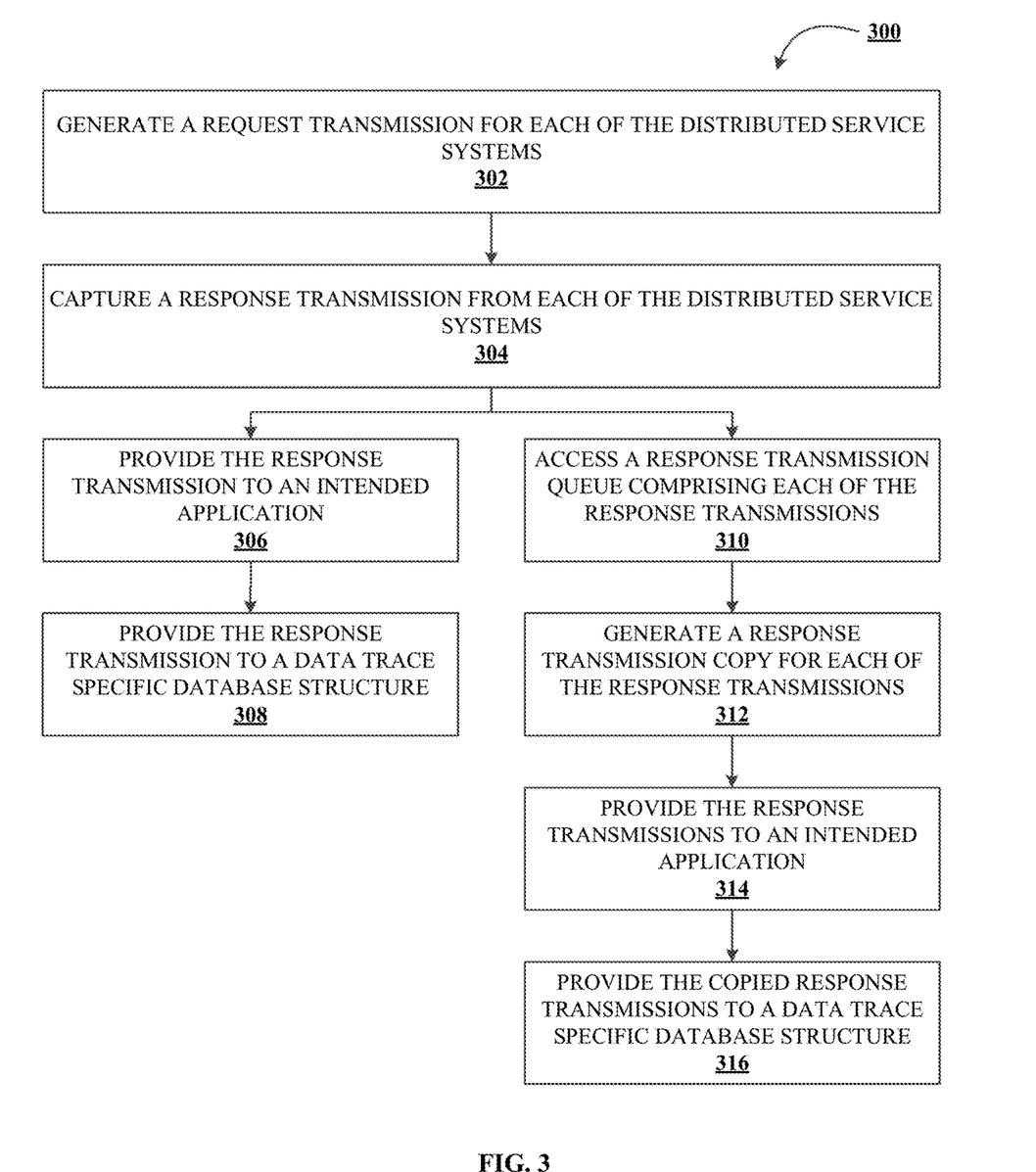
FIG. 3 illustrates a method for data trace related request and response operations in accordance with one or more embodiments of the present disclosure.

FIG. 3 illustrates a flowchart containing a series of operations for data trace related request and response operations (e.g., method 300). The operations illustrated in FIG. 3 may, for example, be performed by, with the assistance of, and/or under the control of an apparatus (e.g., system 130, end-point devices 140, distributed service systems, etc.), as described above. In this regard, performance of the operations may invoke one or more of the components described above with reference to FIGS. 1A-1C (e.g., processor 102, processor 152, etc.).

As shown in operations 302 and 304, in some embodiments, the system 130 may be configured to generate a request transmission for each of the distributed service systems and capture a response transmission from each of the distributed service systems, respectively. As described above with reference to FIG. 2, each of the distributed service systems that are implicated by the requested interaction determination may perform various operations, processes, etc. associated with this interaction. By way of continued example, the requested interaction may refer to a request to determine a particular data entry (e.g., credential, value, threshold, etc.) of a user's account that is associated with the system 130. As such, the request at operation 302 may refer to a request transmission by the system 130 to an example first distributed service system for the particular data entry of the user's account. Similarly, the response transmission at operation 304 may refer to a responsive transmission by the first distributed service system to the system 130 that includes the particular data entry of the user's account as defined by the request transmission. The present disclosure contemplates that the request/response operations described with reference to operations 302 and 304 may similarly occur with each of the distributed service systems implicated by the requested interaction. Furthermore, as described above, each service system specific data trace object may by associated with a trace identifier that is tied to or otherwise associated with each trace data object of the interaction (e.g., a distributed trace implementation).

As would be evident to one of ordinary skill in the art in light of the present disclosure, the data that is generated by each of the distributed service systems is usable or otherwise relevant to the output of the system 130. Said differently, the data generated by the distributed service systems is generated for purposes in addition to the data trace objects described above and may be output to a customer, output to a vendor, stored in a data repository, and/or any other operation associated with standard performance of the interaction. In order to provide support for each of these outcomes, in some embodiments as shown in operations 306 and 308, the system 130 may provide the response transmission from each of the distributed service systems to an intended application associated with the interaction and provide the response transmission from each of the distributed service systems to a data trace specific database structure. By way of example, the system 130 may receive the response transmission described above that provides the particular data entry of the user's account and provide this data entry to an example application that requests this data entry. Unlike conventional systems, however, the system 130 may also provide this response transmission that provides the particular data entry of the user's account to the data trace specific database structure (e.g., as part of a service system specific data trace object forming an interaction object or the like). In doing so, operations 306 and 308 provide a mechanism for storing service system specific data trace information without impacting standard application operating procedures.

In other embodiments, each of the response transmissions from each of the distributed service systems may be provided to a response transmission queue or other file landing zone, location, or the like. As such, as shown in operations 310 and 312, the system 130 may access a response transmission queue comprising each of the response transmissions associated with each of the distributed service systems and generate a response transmission copy for each of the response transmissions. The present disclosure contemplates that the system 130 may leverage any mechanism for transmission copying, mirroring, reproduction, and/or the like based on the nature of the response transmissions, the functionality of the response transmission queue, the intended application of the system 130, and/or the like.

Thereafter, as shown in operations 314 and 316, the system 130 may be configured to provide the response transmissions to an intended application associated with the interaction and provide the copied response transmissions to a data trace specific database structure. Similar to operations 306 and 308 above, system 130 may operate in contrast to conventional systems in that the system 130 may also provide a copied response transmission that provides the particular data entry of the user's account to the data trace specific database structure (e.g., as part of a service system specific data trace object forming an interaction object or the like). In doing so, operations 314 and 316 also provide a mechanism for storing service system specific data trace information without impacting standard application operating procedures (e.g., via a reproduction based implementation). Although described herein with reference to particular example mechanisms for providing the service system specific trace data (e.g., response transmissions of the like), the present disclosure contemplates that the system 130 may leverage any mechanism for ensuring that the response transmissions are provided to both the intended application as well as the data trace specific database structure.

Figure 4:
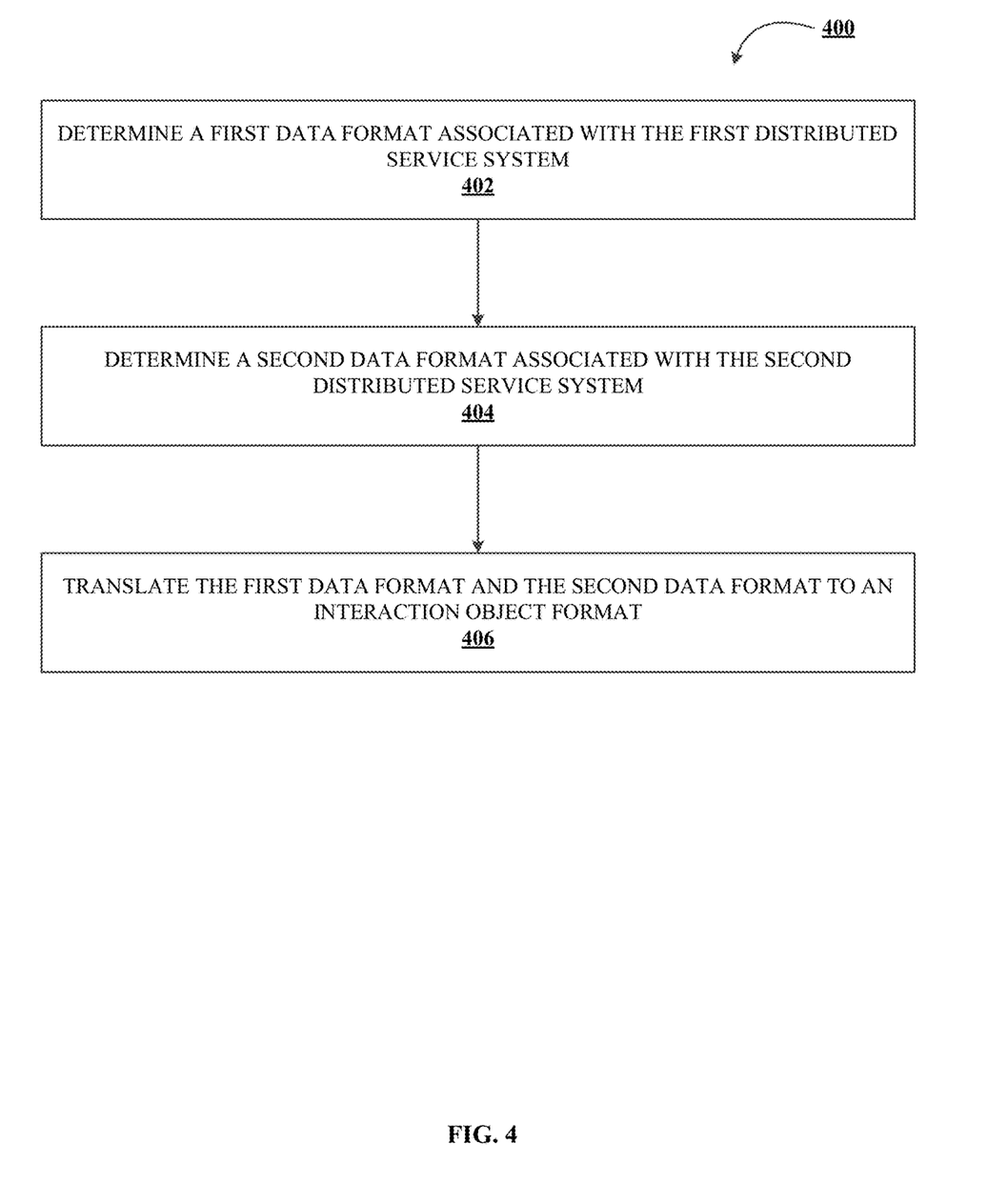
FIG. 4 illustrates a method for data trace data format translation in accordance with one or more embodiments of the present disclosure.

FIG. 4 illustrates a flowchart containing a series of operations for data trace data format translations (e.g., method 400). The operations illustrated in FIG. 4 may, for example, be performed by, with the assistance of, and/or under the control of an apparatus (e.g., system 130, end-point devices 140, distributed service systems, etc.), as described above. In this regard, performance of the operations may invoke one or more of the components described above with reference to FIGS. 1A-1C (e.g., processor 102, processor 152, etc.).

As shown in operations 402 and 404, in some embodiments, the system 130 may be configured to determine a first data format associated with the first distributed service system and determine a second data format associated with the second distributed service system, respectively. As described above, the interaction determination may implicate various distributed service systems that may, for example, each perform various operations, processes, applications, etc. associated with the interaction. In some instances, the operations performed by an example first distributed service system may be different from the operations performed by an example second distributed service system. As such, these first and the second distributed service systems may employ different data formats for storing the data entries forming the service system specific trace data object. Said differently, the format of the service system specific trace data object generated by the first distributed service system may be different from the format of the service system specific trace data object generated by the second distributed service system. The system 130 may be configured to identify these different data formats by, for example, leveraging one or more machine learning (ML) models or techniques. Although described hereinafter with reference to an example ML based implementation, the present disclosure contemplates that the system 130 may leverage any mechanism or technique for determining the data formats described above. Thereafter, the system 130 may be configured to translate the first data format and the second data format to an interaction object format as shown in operation 406. The interaction object format may refer to any format by which the data entries that form the service system specific trace data objects for the distributed service systems may be combined to provide a unform end-to-end representation of the interaction.

By way of a non-limiting example, the first format may include a natural language or free text input, and the second format may include structured data or other structure. As such, the system 130 may employ machine learning techniques to translate the first and second data formats to the interaction object format. The ML algorithms contemplated, described, and/or used herein (e.g., the trained ML model) may include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

The ML models may be trained using repeated execution cycles of experimentation, testing, and tuning to modify the performance of the ML algorithm and refine the results in preparation for deployment of those results for consumption or decision making. The ML models may be tuned by dynamically varying hyperparameters in each iteration (e.g., number of trees in a tree-based algorithm or the value of alpha in a linear algorithm), running the algorithm on the data again, and then comparing its performance on a validation set to determine which set of hyperparameters results in the most accurate model. The accuracy of the model is the measurement used to determine which set of hyperparameters is best at identifying relationships and patterns between variables in a dataset based on the input, or training data. A fully trained ML model is one whose hyperparameters are tuned and model accuracy maximized.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present disclosure may take the form of an entirely software embodiment (including firmware, resident software, microcode, and the like), an entirely hardware embodiment, or an embodiment combining software and hardware aspects that may generally be referred to herein as a "system." Furthermore, embodiments of the present disclosure may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present disclosure, however, the computer-readable medium may be transitory, such as a propagation signal including computer-executable program code portions embodied therein.

It will also be understood that one or more computer-executable program code portions for carrying out the specialized operations of the present disclosure may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present disclosure are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present disclosure are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that may direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present disclosure.

While certain exemplary embodiments have been described and shown in the accompanying drawings, it is to be understood that such embodiments are merely illustrative of, and not restrictive on, the broad disclosure, and that this disclosure not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments may be configured without departing from the scope and spirit of the disclosure. Therefore, it is to be understood that, within the scope of the appended claims, the disclosure may be practiced other than as specifically described herein.

What is claimed is:

1. A system for data trace and sequence determinations in distributed networks, the system comprising:
    at least one non-transitory storage device; and
    at least one processor coupled to the at least one non-transitory storage device, wherein the at least one processor is configured to:
        receive a request for an interaction determination;
        determine a plurality of distributed service systems associated with the interaction,
            wherein the plurality of distributed service systems comprise a sequence defining an order by which operations associated with the interaction are performed by respective distributed service systems; and
            wherein each of the respective distributed service systems comprises one or more trace agents configured to generate service system specific data trace objects;
        capture the service system specific data trace objects for each of the respective distributed service systems;
        generate an interaction object based on the service system specific data trace objects for each of the respective distributed service systems associated with the interaction;
        generate a request transmission for each of the respective distributed service systems;
        capture a response transmission from each of the respective distributed service systems;
        access a response transmission queue comprising each of the response transmissions associated with each of the respective distributed service systems;
        generate a response transmission copy for each of the response transmissions;
        provide the response transmissions to an intended application associated with the interaction; and
        provide the copied response transmissions to a data trace specific database structure.

2. The system of claim 1, wherein each service system specific data trace object comprises one or more data entries associated with one or more metric characteristics of the respective distributed service system.

3. The system of claim 1, wherein the interaction object is stored by a data trace specific database structure.

4. The system of claim 1, wherein the processor is further configured to:
    provide the response transmission from each of the respective distributed service systems to an intended application associated with the interaction; and
    provide the response transmission from each of the respective distributed service systems to a data trace specific database structure.

5. The system of claim 1, wherein the plurality of distributed service systems comprises at least a first distributed service system and a second distributed services system, wherein the processor is further configured to:
    determine a first data format associated with the first distributed service system;
    determine a second data format associated with the second distributed service system; and
    translate the first data format and the second data format to an interaction object format.

6. The system of claim 1, wherein the processor is further configured to perform one or more sanitization operations on one or more data entries forming the service system specific data trace objects.

7. A computer program product for data trace and sequence determinations in distributed networks, the computer program product comprising a non-transitory computer-readable medium comprising code that, when executed, causes an apparatus to:
    receive a request for an interaction determination;
    determine a plurality of distributed service systems associated with the interaction,
        wherein the plurality of distributed service systems comprise a sequence defining an order by which operations associated with the interaction are performed by respective distributed service systems; and wherein each of the respective distributed service systems comprises one or more trace agents configured to generate service system specific data trace objects;

capture the service system specific data trace objects for each of the respective distributed service systems;

generate an interaction object based on the service system specific data trace objects for each of the respective distributed service systems associated with the interaction;

generate a request transmission for each of the respective distributed service systems;

capture a response transmission from each of the respective distributed service systems;

access a response transmission queue comprising each of the response transmissions associated with each of the respective distributed service systems;

generate a response transmission copy for each of the response transmissions;

provide the response transmissions to an intended application associated with the interaction; and provide the copied response transmissions to a data trace specific database structure.

8. The computer program product of claim 7, wherein each service system specific data trace object comprises one or more data entries associated with one or more metric characteristics of the respective distributed service system.

9. The computer program product of claim 7, further comprising code that, when executed, causes the apparatus to:

provide the response transmission from each of the respective distributed service systems to an intended application associated with the interaction; and provide the response transmission from each of the respective distributed service systems to a data trace specific database structure.

10. The computer program product of claim 7, further comprising code that, when executed, causes the apparatus to perform one or more sanitization operations on one or more data entries forming the service system specific data trace objects.

11. The computer program product of claim 7, wherein the interaction object is stored by a data trace specific database structure.

12. A method for data trace and sequence determinations in distributed networks, the method comprising:

receiving a request for an interaction determination;

determining a plurality of distributed service systems associated with the interaction, wherein the plurality of distributed service systems comprise a sequence defining an order by which operations associated with the interaction are performed by respective distributed service systems; and wherein each of the respective distributed service systems comprises one or more trace agents configured to generate service system specific data trace objects;

capturing the service system specific data trace objects for each of the respective distributed service systems;

generating an interaction object based on the service system specific data trace objects for each of the respective distributed service systems associated with the interaction;

generating a request transmission for each of the respective distributed service systems;

capturing a response transmission from each of the respective distributed service systems;

accessing a response transmission queue comprising each of the response transmissions associated with each of the respective distributed service systems;

generating a response transmission copy for each of the response transmissions;

providing the response transmissions to an intended application associated with the interaction; and providing the copied response transmissions to a data trace specific database structure.

13. The method of claim 12, wherein each service system specific data trace object comprises one or more data entries associated with one or more metric characteristics of the respective distributed service system.

14. The method of claim 12, further comprising:

providing the response transmission from each of the respective distributed service systems to an intended application associated with the interaction; and providing the response transmission from each of the respective distributed service systems to a data trace specific database structure.

15. The method of claim 12, further comprising performing one or more sanitization operations on one or more data entries forming the service system specific data trace objects.

16. The method of claim 12, wherein the interaction object is stored by a data trace specific database structure.

* * * * *